United States Patent [19]
Tohyama et al.

[11] 3,944,522
[45] Mar. 16, 1976

[54] AROMATIC POLYHYDRAZIDE FIBER OF HIGH MODULUS AND HIGH TENACITY

[75] Inventors: Shunroku Tohyama; Takuma Jinda; Shigemitsu Saito; Yoshizo Tsuda; Satoshi Shinohara, all of Otsu, Japan

[73] Assignee: Toray Industries, Inc., Tokyo, Japan

[22] Filed: June 16, 1972

[21] Appl. No.: 263,609

[30] Foreign Application Priority Data
July 2, 1971 Japan................................. 46-48083
Nov. 25, 1971 Japan................................. 46-94094

[52] U.S. Cl........ 260/47 CP; 260/30.2; 260/30.6 R; 260/32.4; 260/32.6 N; 260/45.9 R; 260/77.5 R; 260/78 A; 260/78 TF; 264/184; 264/210 F
[51] Int. Cl.²........................................ C08G 73/08

[58] Field of Search ......... 260/47 CZ, 47 CP, 78 A, 260/78 TF, 77.5 R; 264/184, 210 F

[56] References Cited
UNITED STATES PATENTS

| | | | |
|---|---|---|---|
| 3,595,951 | 7/1971 | Logullo............................. | 264/211 |
| 3,600,350 | 8/1971 | Kwolek............................. | 260/32.6 |

*Primary Examiner*—Lester L. Lee

[57] ABSTRACT

High modulus, high tenacity aromatic polyhydrazide fiber composed of
A. a polyterephthal hydrazide unit
B. a poly p-benzamide unit and
C. a poly p-phenylene terephthalamide unit, and method of making same.

4 Claims, 1 Drawing Figure

AROMATIC POLYHYDRAZIDE FIBER OF HIGH MODULUS AND HIGH TENACITY

DETAILED DESCRIPTION OF THE INVENTION

Figure 1:
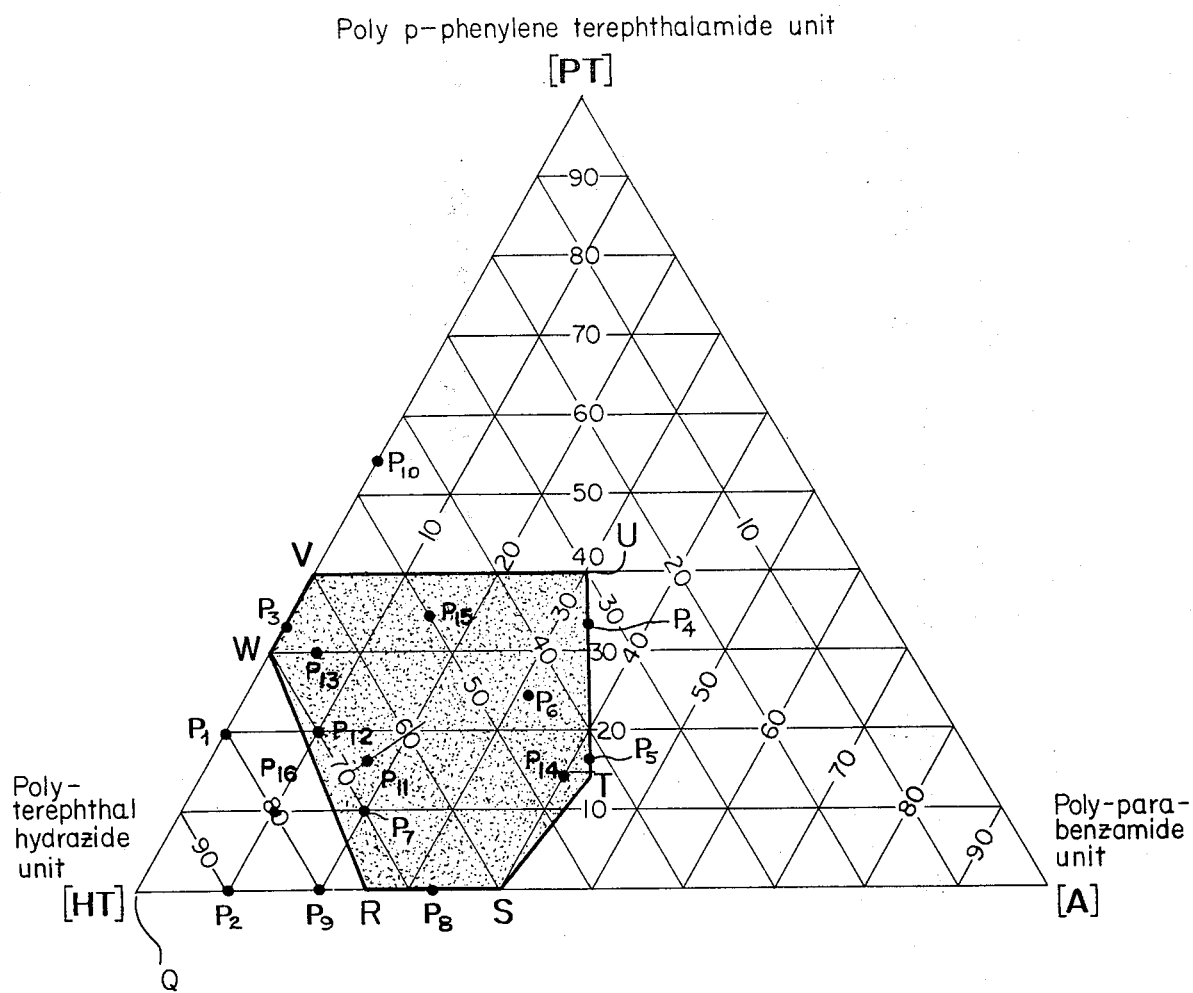

The present invention relates to high tenacity and high modulus polyhydrazide fiber which has excellent heat resistance and chemical resistance, and to a process for the preparation thereof.

More in particular, the invention relates to polyhydrazide fiber composed of a homopolymer or copolymer at least 85 mol % of whose polymer chain consists of repeating units represented by the formulae (A), (B) and (C) in amounts within the range included within a pentagon obtained by connecting by straight lines the points Q, S, T, U and V in the triangular coordinates in the FIGURE.

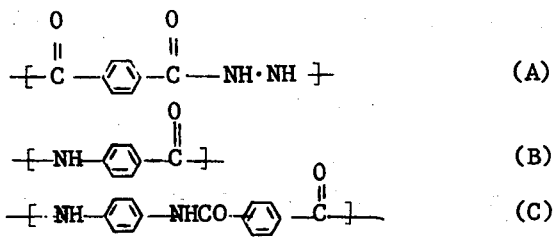

The invention also relates to a process for the preparation of such a polyhydrazide fiber, which comprises wet or dry spinning an organic polar solvent solution of said copolymer and subjecting the resultant filaments to heat treatment.

Heretofore, a fiber having high tenacity and high Young's modulus has been proposed, consisting of an aromatic polymer such as aromatic polyamide, aromatic polyamideimide and an aromatic imide. However, because these polymers normally have remarkably high melting points and few good solvents, it is difficult to apply known spinning techniques to the industrial preparation of fiber from these polymers; also, difficulties are inevitably encountered in practicing the process.

For example, in the specification of Belgian patent No. 726,050, a fiber of high modulus and high tenacity is described, prepared from poly p-phenylene terephthalamides. Poly(p-phenylene terephthalamide) of sufficiently high molecular weight to satisfy performance as a fiber is soluble only in a strong inorganic acid such as concentrated sulfuric acid or hydrofluoric acid, but it is insoluble in ordinary organic or inorganic solvents. When a strong acid is used as a solvent, therefore, the apparatus and operations for fiber formation are restricted in many respects, and it is difficult to prepare fibers from such a poly(p-phenylene terephthalamide) on an industrial scale.

In Journal of Polymer Science, Part A, Vol. 2, pages 1147 – 1156 (1964), an aromatic polyhydrazide is described which is a precursor of poly (1,3,4-oxadiazole) known as a heat resistant polymer. The process for preparing this poly (1,3,4-oxadiazole is also described. It comprises reacting various kinds of dicarboxylic acid dihydrazides with dicarboxylic acid chloride in organic solvents and ring closing the resulting polyhydrazide by heat treatment.

However, the reaction product obtained by reacting these dicarboxylic acid hydrazides with dicarboxylic acid dichloride, especially polyterephthal hydrazide obtained by reacting terephthalic acid hydrazide with terephthalic acid dihalide, has a symmetrical molecular structure and a high crystallinity. So a solution of the polymer in an organic solvent cannot be obtained by this known process.

Therefore, the product cannot be shaped into an article such as fiber or film. And, because of insolubility of the said polyterephthal hydrazide in an organic solvent, the polymerization process does not proceed smoothly and a polymer having a high degree of polymerization is difficult to obtain. Concentrated sulfuric acid, known as the only good solvent for polyterephthal hydrazide has a fatal drawback in that it decomposes polyterephthal hydrazide.

Accordingly, heretofore fiber from a copolymer containing a large amount of a different kind of polymer unit to advance solubility in a solvent, for example, fiber from a copolymer having at least 50 mol % of polyisophthal hydrazide and at most 50 mol % of polyterephthal hydrazide has been proposed. However, the fibers from such copolymers do not develop the excellent performance that are inherent in polyterephthal hydrazide, for example, high modulus of elasticity, and high resistance to heat and solvents.

Fibers from poly p-benzamide and fiber from ordered poamide hydrazide copolymer from p-aminobenzoic acid hydrazide and terephthalic acid chloride, have been proposed and each of them has been known to have high tenacity and high modulus of elasticity.

In case of the former homopoly-p-benzamide, however, there is a drawback that because stability of a monomer, p-amino-benzoic acid halide or thionyl aminobenzoic acid halide is low and so it is difficult to obtain a polymer having a sufficient degree of polymerization, it is difficult to obtain fiber having excellent physical properties. Similarly, in case of the latter specific ordered copolymer, many difficulties are accompanied in spinning, especially in the drawing process, and the physical properties of the fiber obtained are not sufficient for many purposes.

The present inventors conducted strenuous research for high tenacity and high modulus fiber free from the aforesaid drawbacks composed of a homopolymer or copolymer, the main constitutional units of whose polymer chain are a polyterephthal hydrazide unit shown by said formula (A) (hereinafter referred to as [HT] unit), a poly-p-benzamide unit shown by formula (B) (hereinafter referred to as [A] unit) and poly-p-phenylene terephthalamide unit shown by formula (C) (hereinafter referred to as [PT] unit) reached the present invention as a result.

An object of the present invention is to provide a poly hydrazide fiber having remarkably high modulus of elasticity, which has excellent heat resistance and which is substantially insoluble in organic solvents for ordinary synthetic polymers. Another object of the present invention is to provide a process for the preparation of high modulus and high tenacity fiber having excellent spinnability and film forming properties. Other objects of the present invention will become apparent from the following description.

It is necessary that a polymer according to the present invention be a homopolymer or copolymer, at least about 85 mol % of whose polymer unit consists of repeating units of [HT], [A] and [PT] in amounts within the range included within a pentagon obtained by connecting by straight lines the points Q, S, T, U and V in the triangular coordinates in the FIGURE, preferably within the range surrounded by a hexagon obtained by connecting by straight lines the points R, S, T, U, V and W in the triangular coordinates in the FIGURE.

wherein $Ar_1$ and $Ar_2$ are groups selected from the class consisting of

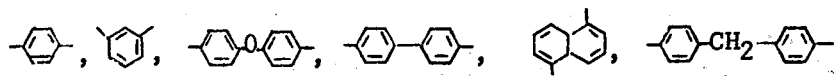

The points Q, R, S, T, U, V and W in the triangular coordinates in the FIGURE represent the compositions (mol %) appearing in the following table.

| Unit | Points | Q | R | S | T | U | V | W |
|---|---|---|---|---|---|---|---|---|
| [HT] | | 100 | 75 | 60 | 42.5 | 30 | 60 | 70 |
| [A] | | 0 | 25 | 40 | 42.5 | 30 | 0 | 0 |
| [PT] | | 0 | 0 | 0 | 15 | 40 | 40 | 30 | and a group obtained by replacing an H atom of these groups with an alkyl group or a halogen atom. $Ar_1$ and $Ar_2$ may be the same or different. $Z_1$ and $Z_2$ are groups selected from the class consisting of —CONH—, —NHCONH— and —CONHNHCO—. $Z_1$ and $Z_2$ may be the same or different.

Specifically, structural units such as

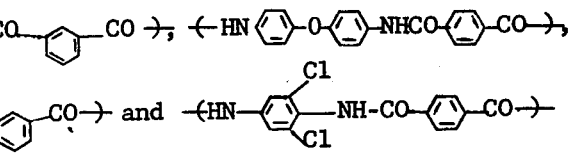

may be copolymerized.

When the polymer chain of the fiber-forming polymer of the present invention consists of said [HT], [A] and [PT] units in amounts outside the range defined in FIG. 1, a high modulus and high tenacity fiber, excellent in heat resistance and chemical resistance, which is an object of the present invention, is not obtained. This is mainly because an organic solvent solution thereof, namely, a spinning solution, is insufficient in stability and poor in spinnability or drawability, and fiber formation is impossible or at least difficult. This is also partly because even if stable polymer solution can be obtained, the mechanical properties of the fiber are inadequate.

Further, in a polymer constituting a fiber of the present invention, it is necessary that at least about 85 mol % of the polymer chain should be constituted by said repeating units in amounts within the range defined in the FIGURE, and even if the relative amount of the repeating units [HT], [A] and [PT] constituting the polymer chain satisfies the range in the FIGURE, when the total amount of said three repeating units become less than about 85 mol %, the tenacity and modulus of the fiber which are basic characteristics of the fiber of the present invention are unfavorably reduced.

However, in order to improve the auxiliary properties such as dyeability and flexibility of fibers of the present invention, at unnoticeable expense to the basic characters of the fiber, it is possible to copolymerize a copolymerization component other than said [HT], [A] and [PT] units in an amount not more than 15 mol %.

With respect to the copolymerization component, for example, the repeating units are exemplified by formulae (1) and (2), as follows:

Further, it is desirable that the polymer of the present invention have an inherent viscosity of at least about 1.0, preferably at least about 1.5. When the inherent viscosity becomes smaller than 1.0, the physical properties of the fiber such as, for example, tenacity and initial modulus of elasticity lower, and the spinnability becomes poor.

It is preferable that the copolymer constituting the fiber of the present invention be a random copolymer of the units [HT], [A] and [PT], because the random copolymer gives better spinnability and drawability than the ordered copolymer, and gives a fiber which is excellent in physical properties. On this point, more will be mentioned later.

Fibers of the present invention have a tenacity of at least about 5 g/d and an initial modulus of at least about 300 g/d, the same or better physical properties than conventional high tenacity and high modulus fibers. Further, as will be mentioned later, the good stability of the polymer solution, and hence excellent spinnability, give the fiber of the present invention a great industrial advantage over high modulus and high tenacity fibers.

In the process of the present invention, the polymer is obtained by solution polymerizing at least one type of acid hydrazide and diamine components shown by the following structural formulae and a substantially equimolar amount thereto of terephthalic acid halide in an organic solvent.

As a diamine or hydrazide component, however, p-amino benzoic acid hydrazide or p-phenylene diamine is not used alone; when they are used, at least one of the other two components must be copolymerized.

The formulae referred to are:

 terephthalic acid dihydrazide

 p-aminobenzoic acid hydrazide

 p-phenylenediamine

As will now be apparent, in the polymerization of acid hydrazide or diamine with terephthalic acid halide, 2 mols of the polymer structural unit [HT] are produced from 1 mol of monomer HTH; from 1 mol of monomer P, 1 mol of the polymer structural unit [PT] is produced, and from 1 mol of monomer AH, 1 mol of the polymer structural unit [HT] and 1 mol of the polymer structural unit [A] are produced.

As will be apparent from the foregoing explanation, using such monomers (HTH, AH and P), the polymer structural unit [HT] always exists in an amount the same as or more than that of the structural unit [A]. (In the FIGURE, not just any composition of points contained in the right half of the triangular coordinates may be selected.)

The monomers HTH and AH are respectively obtained by reacting a terephthalic acid dialkyl ester (for example, dimethyl terephthalate) and P-aminobenzoic acid alkyl ester (for example, ethyl P-aminobenzoate) in the presence or absence of a solvent with an excess amount of hydrazine hydrate under reflux for 4 – 5 hours.

The polymerization reaction is carried out by ordinary low temperature solution polymerization. As a polymerization solvent, one may use a polar solvent of the amide series such as N,N-dimethyl acetamide (DMAC), N-methyl-2-pyrrolidone (NMP), hexamethyl phosphoramide, tetramethyl urea and N-alkyl substituted urea. In order to improve the solubility and stability of the monomer and the polymer produced, it is advisable to carry out polymerization in the presence of an inorganic salt such as an alkali metal salt or an alkaline earth metal salt such as lithium chloride, calcium chloride, magnesium chloride, barium chloride, or beryllium chloride, and, in accordance with the polymer composition, a tertiary amine such as pyridine or N,N-dimethyl aniline.

For obtaining a homopolyterephthal hydrazide solution or a polymer solution having a large content of [HT] unit, it is advantageous and sometimes indispensable to add to said organic polar solvent, a small amount of tertiary amine whose PKa value at 25° C is within the range of 4 – 7, for example, quinoline, pyridine, a substituted aniline such as N,N'-dimethylaniline and N,N-diethylaniline, because addition of these compounds results in advancement of the stability of the polymer solution.

Namely, a tertiary amine whose PKa value is smaller than 4.0 has almost no capacity of stabilizing the polymer solution of the prsent invention, and when it is added, in a process of polymerization, a solid polymer separates and precipitates soon after the polymerization starts.

On the other hand, when adding a tertiary amine whose PKa value is more than 7, although the detailed reason is at present unclear, the polymerization reaction does not proceed smoothly and it is not possible to obtain a colorless, transparent polymer solution. It is considered that because the tertiary amine makes a stable complex with the acid halide, the reaction is unlikely to proceed smoothly and because the solubility in the polar solvent of amine hydrochloride formed is small, uniform polymerization is obstructed.

As an inorganic salt of a metal of Group I and/or II of the Periodic Table, for example, lithium bromide, lithium chloride, magnesium chloride, magnesium bromide, beryllium chloride and calcium chloride are preferably used. In this case, these inorganic salts may be formed in a polymerization process. Such inorganic salts may be added in the form of an inorganic base such as lithium hydroxide and lithium carbonate, which reacts with hydrogen halide formed by the reaction to form the aforesaid salts by which said salts are made to exist within the system. It goes without saying that both an inorganic salt and an inorganic base may be properly used together. However, when adding an inorganic base, because a neutral product such as water is produced within the system, the process is difficult as compared with using an inorganic salt at the initial stage of the reaction to carry out a smooth polymerization reaction and to obtain a stable composition.

These inorganic salts as well as the aforesaid tertiary amines are important for stabilization of the polymer solution of the present invention. When either the tertiary amine or the inorganic salt does not exist, there is a composition range within which a stable polymer solution, which is a key to the present invention, cannot be obtained.

The following description relates to a preferable process for preparing a polymer solution according to the present invention.

At first, a mixture is made comprising at least one type of the aforesaid organic polar solvents, at least one type of HTH, AH and P or a mixture thereof with other polymerization components (diamine, acid hydrazide), a tertiary amine and an inorganic salt of a metal of Group I and/or II of the Periodic Table are mixed. In this case, depending upon the specific monomer, inorganic salt and solvent, the resultant mixture may be heated to about 80° – 120° D for enhancing the solubility of the monomer, HTH. In this case, it is desirable that the amount of the tertiary amine added be about 1.0 – 7.0 times (mol) the amount of —OCNH—NH—CO— group in the polymer to be produced. When such amount is below about 1.0 times (mol), the stability of the polymer in solution is unsatisfactory, although it improves as compared to the case of non-addition, and within a few hours after the polymerization is started, a polymer separates, at which time it becomes opaque and a shaping operation becomes impossible. On the other hand, when the amount added is above about 7.0 times (mol), the polymerization reaction is slow and a high degree of polymerization cannot be obtained finally. It goes without saying that a proper amount of the tertiary amine may be added at the time of polymerization and said amine may be further added after completion of the polymerization to make the amount added abov 7.0 times altogether. However, because there is no particular advantage like advancement of the stability of the solution, and it is meaningless to do so. Actually, an amount of about 1.8 – 3.0 times (mol) is especially effective. However, within the range of the polymer composition of the present invention shown in FIG. 1, there is a composition range within which a stable polymer solution is obtained without adding an organic base. Generally speaking the effect of tertiary amine is manifest when the content of the [HT] unit in the polymer composition is large and the polymer solution is stabilized by addition of said organic base. As for the amount of the inorganic salt to be added, a range of at least about 1% by weight finally based on said organic polar solvent, up to the degree of solubility in the polymerization system, is preferable. If said amount is below 1% by weight, the solubility of the monomer and the polymer produced becomes poor and the objects of the present invention cannot be achieve. Also, it is desirable that in the organic polar solvent, as in ordinary solution polymerization, a compound reacting with the monomer such as an acid halide and making it lose the activity, for example, water must be removed as much as possible. However, since the reaction of terephthalic acid halide and acid hydrazide or diamine is very fast, existence of some amount of water and alcohol is permissible.

Next, terephthalic acid dihalide is incorporated into the solution or dispersed system, in a substantially equimolar amount with respect to the diamine component. It is added as a solid or as a solution. In this case it is not always necessary to add terephthalic acid dihalide all at one time; it may be added in several increments with an interval of several minutes between. It is appropriate to keep the polymerization temperature at $-30°$ to $+60°$ C.

The reaction proceeds rapidly and after about 1 – 2 hours, a very viscous transparent solution is obtained. Depending upon the intended use of the products, the preferable degree of polymerization of the polymer and viscosity of the solution are regulated. In order to control the degree of polymerization, it is permissible to vary the molar ratio of the two kinds of monomers from 1 to a slight degree, or to add a very small amount of a chain terminating agent. As for the concentration of the polymer, although it is dependent upon the purpose for which the solution is to be used, a concentration within the range 3.0 – 15% by weight is most practical. A concentration of less than 3.0% by weight may be usable. However, a polymer solution having such a low polymer concentration is poor in spinnability and in film making properties. On the other hand, when the polymer concentration in the polymer solution becomes more than 15% by weight, the stability of the solution is poor and the polymer separates during the polymerization reaction, or within a few hours after completion of the polymerization. The stability of the solution of a high polymer concentration improves by being stored at a low temperature (from $-20°$ to $0°$ C). A once-precipitated polymer may be dissolved again, but it is difficult to obtain a uniform solution composition by such means.

The so-obtained solution of the polyterephthal hydrazide series of the present invention is very stable. Even when it is allowed to stand at room temperature for a long period of time, no noticeable change is recognized which would bring difficulty to shaping or processing such as precipitation of polymer and change of the viscosity.

Because a polymer solution obtained by the polymerizaton reaction mentioned above is offered per se as a spinning solution, it is advisable to neutralize hydrogen halide formed by the polymerization reaction with an inorganic base such as calcium hydroxide, lithium hydroxide or calcium acetate, or an organic base such as pyridine or N,N'-dimethyl aniline.

The viscosity of the polymer solution varies depending upon the degree of polymerization (inherent viscosity $\eta_{inh}$) of the random copolymer, kind of solvent and the kind of additive (salt, base). In order that the expected physical properties of the fiber may be obtained, it is necessary that the inherent viscosity $\eta_{inh}$ (measured by a method about which mention will be made later) should be at least about 1.0 and, in accordance therewith, it is desirable to adjust the polymer concentration to about 3 – 15% by weight. When the concentration is less than 3% by weight, the viscosity becomes too small and spinning is difficult. On the other hand, when the concentration exceeds 15% by weight, the viscosity becomes too large, spinning under normal spinning conditions becomes difficult and the stability of the polymer solution tends to decrease.

The polymer of the polyhydrazide series so obtained always has an [HT] unit. In case of a copolymer, it has at least one kind of structural unit of [A] and [PT] units besides the [HT] unit. By the previously described methods it gives a stable dope for spinning, etc.

As for the spinning method, normal wet- or dry-spinning may be adopted. Wet-spinning is carried out by extruding the dope through orifices of the spinneret into a coagulating bath, e.g. a water bath maintained at $20°$ – $95°$ C. Other useful coagulants include ethylene glycol, a lower alcohol, mixtures of organic solvent and water, mixtures of alcohol and water, and aqueous salt baths.

Dry-spinning is carried out by extruding said polymer solution from orifices of the spinneret into a heated column whereby the solvent is evaporated.

The so-obtained as spun filaments are freed of solvent, other additives and reaction product by washing with water. Thereafter they undergo drawing with heat treatment at a temperature less than $450°$ for a few second to several tens of seconds under tension, at a draw ratio of several times. The process of drawing is accomplished in one or several steps. The total ratio of draw should be about 1.5 – 4.0. It is also possible to obtain more preferable physical properties of the fiber by treating the drawn filaments in an atmosphere at a temperature of at least about $250°$ C or in a solvent (or a solvent - water system) at a temperature of at least $90°$ C under relaxation or under a slight tension for a few seconds to several tens of minutes.

The fiber obtained possess a high tenacity and a very high initial modulus, i.e., a tenacity of at least 5 g/d, an initial modulus of elasticity of at least 300 g/d and often exceeds 500 g/d and an elongation of 1 – 5%, being very useful for industrial uses, especially as high performance tire cord and reinforced plastic laminate material.

It has been commonly granted that except for the case of isomorphous substitution, a random copolymer is inferior in basic physical properties (tenacity and modulus of elasticity) to a homopolymer. What is surprising is, heretofore, in spite of the fact taken for granted that a random copolymer has higher tenacity and modulus of elasticity than those of a homopolymer as in the case of the present invention which is not a case of isomorphous substitution.

Further, the excellent properties of the fiber of the present invention are developed in the process of spinning and drawing with heat treatment. The physical elucidation has not been completely made. It is, however, apparent from observations in the actual drawing operation and various physical measurements that in contrast to a homopolymer and a specific ordered copolymer which proceeds considerably in crystallinity in the state of as spun filaments and makes the subsequent drawing process very difficult, in case of a random copolymer constituting the fiber of the present invention, the degree of crystallinity before drawing is small and orientation at the time of drawing is quite easily accomplished.

Hereinafter, the present invention will be explained by reference to examples.

In each example, the inherent viscosity ($\eta_{inh}$) of the polymer is a value obtained by diluting the polymerization solution to a polymer concentration of 0.5 g/100 ml of the solvent by a polymerization solvent containing 2.5% by weight of lithium chloride, and measuring at 25° C.

The viscosity of the polymer solution is measured at 25° C using a rotary viscometer.

The tensile characteristics (tenacity, elongation and initial molulus of elasticity) of the fiber are abbreviated T/E/Mi and expressed in their conventional units (g/d)/(%)/(g/d). Using a tensile tester, these characteristics are measured at a sample length of 10 cm and a tensile speed of 10 cm/min.

Referential Example 1

In 20 ml of dehydrated and purified N-methyl pyrrolidone, 0.971 g (1/200 mol) of pure terephthalic acid dihydrazide (HTH), 0.85 g of lithium chloride and 1 ml (2.2/200 mol) of pyridine were dissolved at room temperature. While the resulting solution was cooled with ice water and stirred, 1.015 g (1/200 mol) of terephthalic acid chloride recrystallized after distillation was added as a powder to the solution at one time. After the resultant solution became yellow for a moment, the viscosity of said solution rose rapidly and after 1 hour, a colorless, transparent, viscous solution was obtained. The $\eta_{inh}$ of the obtained polymer was 1.18. The viscosity of the polymerization solution measured by a rotary viscometer was 307 poises at 25° C.

Even after this solution was allowed to stand at room temperature for a month, no turbidity developed and no change of viscosity was recognized.

COMPARATIVE EXAMPLE 1

Referential Example 1 was repeated except pyridine was not added in carrying out polymerization under the same conditions. Within a few minutes after terephthalic acid chloride was added, the system became turbid and ultimately became completely opaque. It solidified after one day and did not fluidize. Any shaping operation, such as film making or spinning, was impossible.

On the other hand, Referential Example 1 was repeated except lithium chloride was not added in carrying out polymerization under the same conditions. Terephthalic acid dihydrazide did not dissolve, and terephthalic acid chloride was added. Immediately, the system became opaque and solidified and could not be stirred. After 3 hours, when the solidified system was gradually heated to 100° C, the product remained an opaque solid and did not become a solution.

REFERENTIAL EXAMPLE 2

Referential Example 1 was repeated except pyridine was not added at first in carrying out polymerization under the same conditions. Two hours after the addition of terephthalic acid dichloride, the system became turbid. Then 1 ml of pyridine was added to the system which hardly exhibited any fluidization and the mixture was vigorously stirred for awhile. Gradually, the system became transparent and 2 hours after addition of pyridine, an almost transparent solution was obtained.

REFERENTIAL EXAMPLE 3

Except using 25 ml of N-methyl-2-pyrrolidone as a solvent and using other various tertiary amines instead of pyridine, Referential Example 1 was repeated in carrying out polymerization. The results are shown in Table 1. The amount of tertiary amine added was 2.2/200 mol in each case.

Table 1

| Tertiary amine added | PKa* | $\eta_{inh}$ of polymer | Stability of the polymerization solution |
|---|---|---|---|
| None | — | Could not be measured | Became turbid 2 hours after addition of terephthalic acid chloride. |
| Quinoline | 4.80 | 1.25 | Solution became transparent during polymerization. Stable solution remained intact after one month. |
| N,N-dimethyl aniline | 5.06 | 1.29 | |
| Pyridine | 5.17 | 1.17 | |
| N,N-diethyl aniline | 6.56 | 1.40 | |
| 2,4-Lutidine | 6.79 | Exact measuring impossible | Gelled at initial stage of polymerization, gradually fluidizing and finally slightly turbid. |
| Triethyl amine | 10.67 | Could not be measured | Yellow precipitate formed immediately after terephthalic acid chloride was added. |

*PKa value: "Great Organic Chemistry", Separate Vol. 2, Asakura Shoten, (1963)

REFERENTIAL EXAMPLE 4

In 20 ml of N-methyl-2-pyrrolidone, 0.971 g (1/200 mol) of terephthalic acid dihydrazide (HTH) and 0.85 g. of lithium chloride were dissolved and after the resultant solution was cooled by ice water, various amounts of N,N-dimethyl aniline were added thereto. While each of the resultant mixtures was stirred, 1.015 g (1/200 mol) of terephthalic acid chloride was added as a powder to said mixture at one time.

The influence of the amounts of N,N-dimethyl aniline in relation to the polymerizability and stability of the solution are shown in Table 2.

Table 2

| Added amount of dimethyl aniline (g) | (mol) | Observations of polymerization | Polymer $\eta_{inh}$ |
| --- | --- | --- | --- |
| 0 | 0 | Became opaque immediately after addition of terephthalic acid chloride. | Could not be measured |
| 0.605 | 1/200 | Became slightly opaque after 20 hours, becoming completely opaque and did not fluidize after 48 hours. | 2.48 |
| 1.21 | 2/200 | Stable solution | 1.90 |
| 2.42 | 4/200 | | 1.62 |

REFERENTIAL EXAMPLE 5

In 20 ml of dehydrated and purified dimethyl acetamide, 0.971 g (1/200 mol) of terephthalic acid dihydrazide (HTH), 0.85 g of lithium chloride and 1.35 ml (2.2/200 mol) of dimethyl aniline were dissolved at 80° C. After the resultant solution was cooled to −15° C, 1.015 g (1/200 mol) of terephthalic acid chloride was added as a powder to the above solution. The viscosity increased slowly (as compared to Referential Example 1) and the solution obtained became a very viscous transparent liquid after 1 hour. After the solution was restored to room temperature, further 10 ml of dimethyl acetamide was added to obtain a uniform colorless, transparent solution. The $\eta_{inh}$ of the polymer was 3.65.

After 48 hours, this solution became slightly opaque and the fluidity decreased to some extent.

REFERENTIAL EXAMPLE 6

In 20 ml of hexamethyl phosphoramide, 0.971 g (1/200 mol) of terephthalic acid dihydrazide (HTH), 0.85 g of lithium chloride and 1 ml (2.2/200 mol) of pyridine were dissolved and after the resultant solution was cooled to 0° C, a mixture of 0.743 g (1/300 mol) of terephthalic acid chloride and 0.372 g (1/600 mol) of isophthalic acid chloride was added as a powder to the solution. The viscosity increased rapidly and after 2 hours, a colorless, transparent, viscous solution was obtained. The $\eta_{inh}$ of the polymer was 1.25.

83% of the structural unit of the polymer obtained was the

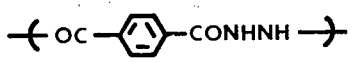

unit, and 17% thereof was the

unit.

The polymer solution obtained was stable after being left to stand at room temperature for one month.

REFERENTIAL EXAMPLE 7

In 20 ml of N-methyl-2-pyrrolidone, 0.7768 g (0.8/200 mol) of terephthalic acid dihydrazide (HTH), 0.1081 g (0.2/200 mol) of P-phenylene diamine, 0.85 g of lithium chloride and 1 ml of pyridine were dissolved and after the resultant solution was cooled to 0° C, 1.015 g (1/200 mol) of terephthalic acid chloride was added as a powder to said solution. The viscosity increased rapidly and after 2 hours, a very viscous, colorless, transparent solution was obtained. The solution was stable after it was left to stand at room temperature for a long period of time and spinning from this solution was possible. This polymer had a $\eta_{inh}$ of 2.41.

80% of the structural unit of this polymer was

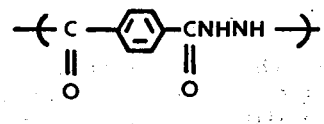

and 20% thereof was

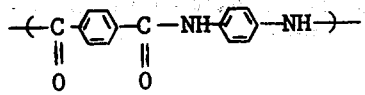

and it corresponded to the point $P_1$ in FIG. 1.

REFERENTIAL EXAMPLE 8

In 20 ml of dimethyl acetamide, 0.971 g (1/200 mol) of terephthalic acid dihydrazine (HTH), 2.22 g (2/200 mol) of anhydrous calcium chloride and 1.35 ml (2.2/200 mol) of N,N-dimethyl aniline were heated to 120° C and dissolved, and the resulting solution was cooled to −5° C. While the resulting solution was vigorously stirred, 1.015 g (1/200 mol) of terephthalic acid chloride was added as a powder. After 1 hour, a colorless, transparent, viscous solution was obtained. The $\eta_{inh}$ of the polymer was 1.62.

EXAMPLE 1

In 60 ml of N-methylpyrrolidone, 2.193 g of terephthalic acid dihydrazide (HTH), 2.55 g of lithium chloride and 5.4 ml of N,N-dimethyl aniline were dissolved, and after the resultant solution was cooled by ice water, 3.045 g of terephthalic acid dichloride was added in a powder state to said solution at one time. While the system was continuously stirred, the viscosity of the system increased rapidly and after 2 hours, a colorless, transparent, viscous solution was obtained. When the viscosity of said solution was measured using a rotary viscometer, the viscosity of this polyterephthal hydrazide solution at 25° C was 3020 poises. The inherent viscosity ($\eta_{inh}$) of this polyterephthal hydrazide was 2.81. The polymer concentration based on the entire solution was 6.6% by weight. The composition of this polymer is shown by the point Q in the FIGURE.

The solution of polyterephthal hydrazide so obtained was extruded from a spinneret having 6 orifices, each having a diameter of 0.08 mm at a speed of 0.3 cc/min into water at 20° C and the resultant filaments were wound up at a speed of 4.5 m/min (draft ration 0.45) to produce undrawn filaments. The tenacity (T), elongation (E) and initial modulus of elasticity (Mi) were 2.11 g/d, 28.7% and 69.8 g/d respectively.

The physical properties of the yarn obtained by drawing the as-spun filaments on a hot plate heated at 320° C and 370° C for about 10 seconds were as shown in Table 3.

Table 3

| Heat treating temperature | Draw ratio | T (g/d) | E (%) | Mi (g/d) |
| --- | --- | --- | --- | --- |
| 320° C | 1.4 | 5.34 | 2.6 | 307 |
| 370° C | 1.4 | 5.23 | 3.6 | 263 |

From the infrared absorption measurements, differential thermal analysis and thermal gravimetric analysis of the resulting yarn, it was confirmed that the fiber consisted of a polyterephthal hydrazide polymer exhibiting no dehydration, ring closure to 1, 3, 4-oxadiazole.

EXAMPLE 2

In 90 ml of dimethyl acetamide, 3.884 g of terephthalic acid dihydrazide (HTH) and 4.44 g of calcium chloride were dissolved at 120° C. After the resulting solution was cooled to −10° C, 4 ml of pyridine were added thereto. While the mixture was stirred, 4.060 g of terephthalic acid dichloride powder were added to said mixture. The solution obtained was stirred at a temperature from −10° C to −5° C for 1 hour, and thereafter stirred at 25° C for 1 hour to produce a viscous, colorless, transparent solution. The polymer concentration of this solution was 5.9 % and the viscosity of the solution at 25° C was 480 poises. The inherent viscosity of the polyterephthal hydrazide obtained was 2.54.

The resulting solution of polyterephthal hydrazide was extruded from a spinneret having 6 orifices, each having a diameter of 0.08 m, at a speed of 0.3 ml/min into water. At that time, the temperature of the coagulating bath of water and the draft ratio (ratio of the winding speed to the extruding speed) were changed to obtain 2 kinds of undrawn filaments. The properties of said two kinds of filaments appear in Table 2.

Table 2

| Temperature of the coagulating bath | Draft ratio | T (g/d) | E (%) | Mi (g/d) |
| --- | --- | --- | --- | --- |
| A | 20° C | 0.5 | 2.16 | 35.0 | 64.5 |
| B | 55° C | 1.0 | 2.11 | 27.2 | 85.1 |

The undrawn filaments obtained in Table 2 were subjected to heat treatment under various conditions as shown in Table 3. The physical properties of the yarns obtained are also shown in Table 3.

Table 3

| Kind of drawn filaments (c.f. Table 2) | Conditions of Heat Treatment | | Yarn quality | | |
| --- | --- | --- | --- | --- | --- |
| | Temperature | Draw ratio | T (g/d) | E (%) | Mi (g/d) |
| A | 320° C | 1.50 | 5.39 | 2.3 | 316 |
| B | 320° C | 1.50 | 4.52 | 2.4 | 286 |
| B | 320° C | 1.30 | 4.18 | 2.7 | 211 |
| A | Boiling water and at 320° C | 1.50 1.10 | 4.82 | 2.3 | 360 |
| A | Boiling water and at 320° C | 1.30 1.20 | 4.74 | 1.60 | 412 |

From Table 3, it is understood that fibers consisting of 100% polyterephthal hydrazide had a very high value of Mi (initial modulus of elasticity). As compared to the best polyhydrazide fibers hitherto known consisting of 50% of polyterephthal hydrazide and 50% of polyisophthal hydrazide whose yarn quality values are T/E/Mi = 6.0/8/151, it is a characteristic of the present invention that the value of Mi is considerably higher.

COMPARATIVE EXAMPLE 3

In preparation of the polymer solution of comparative Example 1, instead of terephthalic acid chloride, 3.045 g of a mixture of various ratios of terephthalic acid chloride (TPCl) and isophthalic acid chloride (IPCl) was used, except which the polymerization was carried out under exactly the same conditions to obtain various polymer solutions as shown in Table 4. The physical properties of these solutions are also shown in Table 4.

Table 4

| | Monomer ratio | | Ratio of structural units polymer (%) | | Viscosity of the polymer solution (poise) | Inherent viscosity ($\eta_{inh}$) |
| --- | --- | --- | --- | --- | --- | --- |
| | TPCl | IPCl | HT* | HI* | | |
| A (Comparative Example 1) | 100 | 0 | 100 | 0 | 3020 | 2.81 |
| B | 70 | 30 | 85 | 15 | 1400 | 2.56 |
| C | 50 | 50 | 75 | 25 | 1610 | 2.61 |
| D | 40 | 60 | 70 | 30 | 1280 | 2.46 |

*Structural unit

HT : 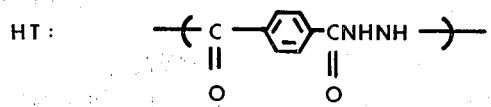

HI: 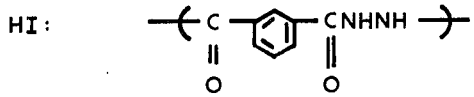

The obtained polymer solutions shown in Table 4 were spun under conditions the same as those in comparative Example 1 and subjected to heat treatment under the same conditions (320°C, drawing 1.4 times). The physical properties of the resulting yarns are shown in Table 5.

Table 7

| Polymer solution | Polymer structure HT/IT | T (g/d) | E (%) | Mi (g/d) |
|---|---|---|---|---|
| A (Example 1) | 100/0 | 5.34 | 2.6 | 307 |
| B | 85/15 | 5.16 | 4.8 | 268 |
| C | 75/25 | 4.84 | 6.8 | 225 |
| D | 70/30 | 4.96 | 7.2 | 186 |

As will be seen from Table 7, as the composition of the polyterephthal hydrazide unit changed, the physical properties (E, Mi) changed remarkably.

EXAMPLE 4

In 100 ml of hexamethylene phosphoramide, 3.207 g (1.6/100 mol) of terephthalic acid dihydrazide (HTH) 0.605 g (0.4/100 mol) of p-aminobenzoic acid hydrazide (AH) and 3.6 g of anhydrous lithium chloride were dissolved and after the resulting solution was cooled to 0°C, 4.0 ml of pyridine were added thereto. When 4.060 g of terephthalic acid chloride powder were added to the resulting solution with stirring, the viscosity increased rather slowly and after about 3 hours, a colorless, transparent, viscous solution was obtained. The inherent viscosity ($\eta_{inh}$) of the resulting polymer was 1.86. The composition of the resulting polymer is shown by the point $P_2$ in the FIGURE, 90% of polyterephthal hydrazide unit

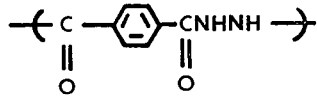

and 10% of polybenzamide unit

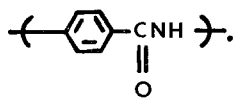

From the polymer solution so obtained, undrawn filaments were prepared under the same conditions as in Example 1, which was drawn 1.5 times in hot water and then drawn 1.8 times on a hot pin at 320°C to obtain yarn, whose physical properties (T/E/Mi) were 6.3 g/d, 2.9% and 520 g/d.

REFERENTIAL EXAMPLE 9

Using procedures to be described in further detail hereafter, polymer solutions A, B, C, D, E and F corresponding to different copolymerization compositions were prepared.

Polymer solution A

While nitrogen was blown into a 200 ml three-necked flask equipped with a stirring rod, a nitrogen inlet tube and a calcium chloride drying tube, the flask was heated by the flame of a Bunsen burner. Into the flask, 100 ml of dried and dehydrated N-methyl pyrrolidone (NMP), 3.40 g of lithium chloride, 1.9419 g (0.01 mol) of terephthalic acid dihydrazide (HTH), 1.0816 g (0.01 mol) of P-phenylene diamine (P) and 5.40 ml (0.022 mol) of N,N-dimethyl aniline were added to this sequence, and the flask was heated to about 100°C to dissolve the contents completely.

The flask was then cooled to −20°C, and 4.060 g (0.02 mol) of terephthalic acid chloride were added as a powder to the contents, in two stages of one-half each stage, (interval of 15 minutes) and the resulting solution was stirred at a temperature from −20°C to −10°C. The reaction was continued in this state for 2 hours to obtain a very viscous polymer solution (polymer concentration 4.9%). The viscosity of the polymer solution obtained was 1800 poises and the inherent viscosity ($\eta_{inh}$) of the polymer was 4.74.

The composition of the random copolymer obtained was shown by the point $P_3$ in FIG. 1, consisting of 67 mol % of polyterephthal hydrazide unit (HT) and 33 mol % of poly P-phenylene terephthalamide unit (PT).

Polymer solution B

Using the aforesaid reaction apparatus, in 110 ml of NMP, 2.4 g of lithium chloride, 1.8744 g (0.0124 mol) of p-amino-benzoic acid hydrazide (AH) and 1.3408 g (0.124 mol) of p-phenylene diamine (P) were dissolved at room temperature. After the resulting solution was cooled to −25°C, 5.0348 g (0.0248 mol) of terephthalic acid chloride powder were added to said solution in two stages (interval 15 minutes), the resulting solution was stirred for 30 minutes, and thereafter the solution was kept cool by an ice bath (0°C) for 2 hours and thus reacted to obtain a viscous solution, which solution was neutralized by 1.19 g of anhydrous lithium hydroxide. The viscosity of the polymer solution obtained (polymer concentration 5.2%) was 1440 poises and the inherent viscosity ($\eta_{inh}$) of the polymer was 5.32. The composition of the random copolymer so obtained is shown by the point $P_4$ in the FIGURE, consisting of 33.3 mol % of poly P-phenylene terephthalamide unit [PT], 33.3 mol % of polyterephthal hydrazide unit [HT] and 33.3 mol % of poly P-benzamide unit [A].

Polymer solution C

In 110 ml of NMP, 2.1164 g (0.014 mol) of P-aminobenzoic acid hydrazide (AH), 0.6488 g (0.006 mol) of P-phenylene diamine (P) and 1.8 g of lithium chloride were dissolved at room temperature, and the resulting solution was cooled to −20°C. Thereafter, 4.0604 g (0.02 mol) of terephthalic acid chloride powder were added to said solution in two equal stages (interval 15 minutes), the resulting solution was continuously stirred for 15 minutes in that state, and thereafter stirring was continued for 2 additional hours at 0°C and the solution was neutralized by 1.19 g of anhydrous lithium hydroxide to obtain a yellow, transparent, viscous solution (polymer concentration 4.4%). The viscosity of the polymer solution obtained was 2480 poises and the inherent viscosity ($\eta_{inh}$) of the random copolymer is shown by the point $P_5$ in FIG. 1, consisting of 41.2 mol % of polyterephthal hydrazide uunit [HT], 41.2 mol % of poly P-benzamide unit [A] and 17.6 mol % of poly P-phenylene terephthalamide unit [PT].

Polymer solution D

In 100 ml of N,N-dimethyl acetamide, 5.55 g of calcium chloride, 1.5100 g (0.01 mol) of P-aminobenzoic acid hydrazide (AH), 0.3890 g (0.002 mol) of terephthal acid dihydrazide (HTH) and 0.8660 g (0.008 mol) of P-phenylene diamine (P) were dissolved at room temperature, the resulting solution was cooled to −20° C, and thereafter, 4.0604 g (0.02 mol) of terephthalic acid chloride powder were added to said solution in two equal stages (interval 15 minutes). After the solution obtained was stirred while being cooled to −20° C for 15 minutes, the reaction was continued for 2 hours in ice water bath at 0° C and the reaction product was neutralized by 3.53 g of calcium acetate monohydrate to obtain a viscous solution (polymer concentration 4.9%). The viscosity of the polymer solution obtained was 1400 poises and the inherent viscosity ($\eta_{inh}$) of the copolymer was 5.30.

The composition of the random copolymer so obtained is shown by the point $P_6$ in FIG. 1, consisting of 43.8 mol % of polyterephthal hydrazide unit [HT], 25 mol % of poly P-phenylene terephthalamide unit [PT] and 31.2 mol % of poly P-benzamide unit [A].

Polymer solution E

In 100 ml of NMP, 1.7479 g (0.009 mol) of terephthalic acid dihydrazide (HTH), 0.3900 g (0.0036 mol) of P-phenylene diamine (P), 1.120 g (0.0074 mol) of P-aminobenzoic acid hydrazide (AH) and 0.85 g of lithium chloride were dissolved at 90° C. After the resulting solution was cooled to −20° C, 4.0604 g (0.02 mol) of terephthalic acid chloride powder was added in two equal increments (interval 15 minutes). After 3 hours, a yellow, transparent, viscous solution was obtained, which was neutralized by 1.68 g of lithium hydroxide monohydrate to obtain a copolymer solution whose copolymer concentration was 5.27%. The viscosity of the solution obtained was 2400 poises and the inherent viscosity ($\eta_{inh}$) of the copolymer was 5.50.

The composition of this random copolymer is shown by the point $P_7$ in FIG. 1, consisting of 70 mol % of polyterephthal hydrazide unit [HT], 10 mol % of poly P-phenylene terephthalamide unit [PT] and 20 mol % of poly P-benzamide unit [A].

Polymer solution F

In 100 ml of NMP, 3.40 g (0.080 mol) of lithium chloride, 2.220 g (0.0147 mol) of P-aminobenzoic acid hydrazide (AH) and 1.420 g (0.0073 mol) of terephthalic acid dihydrazide (HTH) were dissolved at room temperature, the resulting solution was cooled to −15° C and thereafter 4.460 g (0.0220 mol) of terephthalic acid dichloride was added to said solution. The solution obtained was stirred at −15° C for 30 minutes. Further, the reaction was continued for 2 hours at room temperature and thereafter 39 ml of NMP added to the reaction product to dilute the same. The diluted solution was neutralized with 1.850 g of lithium hydroxide monohydrate. The neutralized solution had a polymer concentration of 4.3% and a viscosity of 6100 poises and the $\eta_{inh}$ of the copolymer was 6.72.

The composition of the random copolymer so obtained is shown by the point $P_8$ in FIG. 1, consisting of 67 mol % of [HT] unit and 33 mol % of [A] unit.

EXAMPLE 5

Each of the polymer solutions A, B, C, D, E and F obtained in Referential Example 9 was defoamed under a reduced pressure, and thereafter extruded from a spinneret having 6 orifices, each having a diameter of 0.8 mm, at a speed of 0.3 ml/min into a coagulating bath having a length of 100 cm composed of an aqueous solution of lithium chloride (at a concentration of 300 g/1000 ml of water), and the resulting filaments were wound up at a speed of 7 m/min to obtain undrawn filaments.

In the case of the polymer solution C, the winding speed at the time of spinning was 8 m/min. In the case of the polymer solution D, an aqueous solution of calcium chloride having a concentration of 300 g/1000 ml of water was used as a coagulating bath. In the case of the polymer solution F, the winding speed at the time of spinning was 6 m/min.

The undrawn filaments obtained were subject to various draw procedures, with heat treatments as shown in Table 8, to obtain yarns A, B, C, D, E and F having physical properties as shown in Table 8.

Table 8

| Polymer solution | Spinning Conditions | Drawing and heat treating conditions | Sample Designation | Yarn quality | | | Denier |
|---|---|---|---|---|---|---|---|
| | | | | T | E | Mi | |
| A | Orifice diameter 0.08 mm, number of orifices 6, Discharging speed 0.3 ml/min Spinning bath LiCl aqueous solution (300 g/liter) Bath length 1 m Winding speed 7 m/min After spinning under said conditions, washed in hot water at 90° C | Non-treated | $A_1$ | 3.3 | 3.3 | 91 | 7.6 |
| | | Hot plate at 326° C, drawn 1.9 times | $A_2$ | 10.7 | 2.9 | 575 | 6.4 |
| | | Hot plate at 370° C, drawn 1.8 times | $A_3$ | 13.9 | 2.7 | 552 | 6.6 |
| | | $A_3$ was left to stand in air at 300° C under relaxed state | $A_4$ | 14.1 | 2.7 | 560 | 6.6 |
| B | Exactly the same as A | Hot plate at 320° C, drawn 1.6 times | $B_1$ | 9.3 | 2.0 | 640 | 5.2 |

Table 8-continued

| Polymer solution | Spinning Conditions | Drawing and heat treating conditions | Sample Designation | Yarn quality T | E | Mi | Denier |
|---|---|---|---|---|---|---|---|
| | | Hot plate at 320° C, drawn 1.8 times | $B_2$ | 11.0 | 2.3 | 625 | 4.3 |
| | | Hot plate at 380° C, drawn 1.6 times | $B_3$ | 14.2 | 2.8 | 622 | 5.1 |
| | | Hot plate at 380° C, drawn 2.2 times | $B_4$ | 15.9 | 2.6 | 693 | 4.0 |
| | | $B_1$ was heated by hot plate at 380° C, drawn 1.05 times | $B_5$ | 15.9 | 2.8 | 718 | 4.7 |
| | | $B_1$ was heated by hot plate at 420° C, drawn 1.05 times | $B_6$ | 14.7 | 2.4 | 713 | 4.5 |
| C | The same as A except winding speed which is 8 m/min | Non-treated | $C_1$ | 4.2 | 2.2 | 148 | 10.0 |
| | | Hot plate at 320° C, drawn 2.3 times | $C_2$ | 13.3 | 2.4 | 712 | 4.8 |
| | | $C_2$ was heated on hot plate at 320° C, drawn 1.1 times | $C_3$ | 16.2 | 2.4 | 722 | 4.0 |
| | | Hot plate at 320° C, drawn 2.0 times | $C_4$ | 17.6 | 2.5 | 755 | 5.8 |
| | | $C_4$ was heated on hot plate at 380° C, drawn 1.05 times | $C_5$ | 21.4 | 2.9 | 814 | 5.7 |
| | | $C_4$ was heated on hot plate at 380° C, drawn 1.2 times | $C_6$ | 17.7 | 2.6 | 776 | 5.2 |
| | | $C_4$ was heated on hot plate at 380° C, drawn 1.3 times | $C_7$ | 19.3 | 2.6 | 811 | 5.0 |
| | | Hot plate at 320°C, drawn 2.2 times | $C_8$ | 16.4 | 2.4 | 720 | 4.4 |
| | | $C_8$ was heated on hot plate at 380° C, drawn 1.1 times | $C_9$ | 20.6 | 2.6 | 815 | 4.2 |
| | | $C_9$ was heated on hot plate at 380° C, drawn 1.2 times | $C_{10}$ | 17.8 | 2.5 | 720 | 4.2 |
| D | The same as A except spinning bath which is $CaCl_2$ aqueous solution (300 g/liter) | Non-treated | $D_1$ | 3.6 | 3.7 | 92 | 19.3 |
| | | Hot plate at 320° C, drawn 2 times | $D_2$ | 11.6 | 2.8 | 536 | 6.8 |
| | | $D_2$ was heated on hot plate at 380° C, drawn 1.05 times | $D_3$ | 17.7 | 3.2 | 654 | 6.4 |
| | | Hot plate at 320°C, drawn 2.3 times | $D_4$ | 13.9 | 3.0 | 610 | 5.7 |
| | | $D_4$ was heated on hot plate at 380° C, drawn 1.1 times | $D_5$ | 18.6 | 3.2 | 659 | 5.0 |
| E | The same as A | Non-treated | $E_1$ | 3.7 | 3.1 | 98 | 15.6 |
| | | Hot plate at 320° C, drawn 2.0 times | $E_2$ | 14.6 | 3.5 | 570 | 7.6 |
| | | $E_2$ was heated on hot plate at 380° C, | $E_3$ | 19.6 | 3.1 | 660 | 7.2 |

Table 8-continued

| Polymer solution | Spinning Conditions | Drawing and heat treating conditions | Sample Designation | Yarn quality T | E | Mi | Denier |
|---|---|---|---|---|---|---|---|
| | | drawn 1.05 times | | | | | |
| F | The same as A except winding speed which is 6 m/min | Hot plate at 240°C, drawn 2.5 times | $F_1$ | 15.2 | 3.3 | 600 | 5.3 |
| | | Hot plate at 320°C, drawn 3.0 times | $F_2$ | 17.5 | 3.4 | 658 | 4.4 |
| | | $E_2$ was heated on hot plate at 350°C, drawn 1.05 times | $F_3$ | 24.2 | 4.2 | 726 | 4.0 |
| | | $E_2$ was heated on hot plate at 380°C, drawn 1.05 times | $F_4$ | 18.5 | 3.7 | 646 | 4.3 |

EXAMPLE 6

In 70 ml of NMP, 2.1930 g (0.03 mol) of terephthalic acid dihydrazide (HTH), 2.55 g of lithium chloride and 5.4 ml of N,N-dimethyl aniline were dissolved and after the resulting solution was cooled to −20° C, 3.0450 g (0.03 mol) of terephthalic acid chloride was added as a powder thereto in two equal stages (interval 15 minutes).

Stirring was continued and after 2 hours, a colorless, transparent, viscous solution (polymer concentration 5.9%) was obtained. The viscosity of this solution was 2700 poises and the inherent viscosity of the polymer was 4.64. The composition of the polymer so obtained was a polyterephthal hydrazide [HT] homopolymer represented by the point Q in FIG. 1.

This solution was spun under conditions the same as in Example 5 (except changing the winding speed to 5.5 m/min which was the maximum stable winding speed) and treated with hot water to obtain undrawn filaments, which were drawn under conditions shown in Table 9 to obtain yarns having physical properties shown in Table 9.

Table 9

| Sample name | Drawing conditions* | Denier (D) | Yarn quality (T/E/Mi) |
|---|---|---|---|
| A | Hot plate at 320°C, drawn 1.4 times | 14.6 | 6.6/2.6/341 |
| B | Hot plate at 380°C, drawn 1.4 times | 14.4 | 7.2/3.5/385 |
| C | Same as A, but drawn 1.05 times on hot plate at 380°C | 12.8 | 8.8/3.0/440 |

*Draw ratio was chosen as large as possible consistent with smooth drawing.

As will be apparent from Table 9, the winding speed (draft) in spinning and draw ratio with this composition could not be elevated and hence the physical properties of the yarns produced were quite inferior as compared with the yarn quality values of the fibers of Example 5, namely, yarns A and E. In other words, it is to be understood that the random copolymer, constituting the fiber of the present invention, gives a larger draft and draw ratio at the time of spinning and drawing than the homopolymer, and a highly oriented fiber having excellent tensile characteristics is obtained.

EXAMPLE 7

In 110 ml of NMP, 2.3304 g (0.012 mol) of terephthalic acid dihydrazide (HTH), 1.2094 g (0.008 mol) of P-aminobenzoic acid hydrazide (AH), 2.1 g of lithium chloride and 5.3 ml of dimethyl aniline were dissolved. After the resulting solution was cooled to −20° C, 4.0604 g (0.02 mol) of terephthalic acid dichloride was added as a powder in equal increments and at an interval of 15 minutes. After continuing stirring in a bath at −20° C. for 15 minutes, the reaction was continued in a bath at 0° C for 2 additional hours to obtain a viscous, transparent solution (polymer concentration 5.0%). The viscosity of the solution was 2200 poises and the inherent viscosity of the copolymer was 5.71. The composition of the copolymer so obtained is shown by the point $P_9$ in FIG. 1, consisting of 80 mol % of the polyterephthal hydrazide unit [HT] and 20 mol % of the poly P-benzamide unit [A].

The polymer solution so obtained was defoamed under a reduced pressure and using the method of Example 5, undrawn filaments were obtained. Further, the undrawn filaments obtained were drawn with heat treatment under various conditions as shown in Table 8 to obtain yarns having properties as shown in Table 10.

Table 8

| Sample name | Drawing conditions* | Denier (D) | Yarn quality (T/E/Mi) |
|---|---|---|---|
| A | Non-treated (yarn treated in hot water) | 25.8 | 3.3/2.8/79 |
| B | Not plate at 330°C, drawn 1.5 times | 14.6 | 9.6/3.5/402 |
| C | B was drawn 1.1 times on hot plate at 380°C | 13.2 | 11.2/3.1/465 |
| D | C was drawn 1.2 times on hot plate at 380°C | 12.6 | 12.1/3.0/481 |

*Draw ratio was the maximum stable draw ratio at each temperature.

The physical properties of yarns shown in Table 8 advance considerably by copolymerization of 20 mol % of poly P-benzamide unit [A] as compared with a yarn consisting of polyterephthal hydrazide unit [HT] only (Example 6). However, when compared with the yarn F in Example 5 ([HT]/[A] = 67/33), the physical properties are considerably inferior. Accordingly, it is understood that by changes of composition of the copolymer, the physical properties of the fiber are also changed.

EXAMPLE 8

In 100 ml of NMP, 2.5827 (0.013 mol) of terephthalic acid dihydrazide (HTH), 0.7247 g (0.0067 mol) of P-phenylene diamine (P), 3.4 g of lithium chloride and 5.4 ml of N,N-dimethyl aniline were dissolved at 90° C. After the resulting solution was cooled to −20° C, 4.0604 g (0.02 mol) of terephthalic acid chloride powder was added in two halves (interval 15 minutes).

The reaction was continued to produce a yellow, transparent polymer solution having a viscosity of 2400 poises (polymer concentration 5.1%). The inherent viscosity ($\eta_{inh}$) of this copolymer was 4.65. The composition of the copolymer so obtained was shown by the point $P_1$ in the FIGURE, consisting of 80 mol % of polyterephthal hydrazide [HT] and 20 mol % of poly P-phenylene terephthalamide [PT].

The polymer solution so obtained was defoamed under a reduced pressure and thereafter spun under conditions exactly the same as those in Example 5 to obtain undrawn filaments (filaments treated in hot water). The as-spun filaments were drawn with heat treatment under various conditions as shown in Table 11 to obtain yarns having tensile characteristics as shown in Table 11.

Table 11

| Sample name | Drawing conditions* | Denier (D) | Yarn quality (T/E/Mi) |
|---|---|---|---|
| A | Non-treated (yarn treated in hot water) | 15.2 | 3.2/3.1/86 |
| B | Hot plate at 320° C, drawn 1.7 times | 8.6 | 9.8/2.6/485 |
| C | Hot plate at 370° C, drawn 1.6 times | 8.8 | 10.8/2.7/490 |
| D | Like B, but was drawn 1.05 times on hot plate at 380° C | 8.4 | 12.5/3.1/511 |

*Draw ratio was chosen as high as possible for smooth drawing.

From Table 11, it should be understood that fiber from a copolymer having a composition of $P_1$ has higher tenacity and higher modulus as compared with Example 6. However, the drawability and yarn quality of said fiber are inferior when compared with the fiber A in Example 5.

COMPARATIVE EXAMPLE 2

In 100 ml of NMP, 1.16518 g (0.006 mol) of terephthalic acid dihydrazide (HTH), 1.5140 g (0.014 mol) of P-phenylene diamine (P), 5.3 ml of N,N-dimethyl aniline and 3.4 g of lithium chloride were dissolved at an elevated temperature. After the resulting solution was cooled to −20° C, 4.0604 g (0.02 mol) of terephthalic acid chloride was added as a powder thereto in two equal increments (interval 15 minutes) in an attempt to prepare a copolymer having a composition shown by the point $P_{10}$ in FIG. 1. As the viscosity rose, however, the solution became opaque, and 2 hours after the terephthalic acid chloride was added, the solution became completely opaque. Even when 50 ml of NMP was added, said solution was not dissolved. Accordingly, from an organic solvent solution of a random copolymer having a composition shown by the point $P_{10}$ in FIG. 1 [HT]/[PT] = 46/54 mol %), fibers could not be obtained. This polymer was soluble in sulfuric acid. However, it was rapidly decomposed in sulfuric acid, and it was impossible to obtain a stable spinning solution.

EXAMPLE 9

In 110 ml of NMP, 1.9048 g (0.0126 mol) of p-aminobenzoic acid hydrazide (AH), 0.5840 g (0.0054 mol) of p-phenylene diamine (P), 0.2000 g (0.002 mol) of 4,4'-diaminodiphenyl ether, and 1.8 g of lithium chloride were dissolved at room temperature. While the resulting solution was being stirred at room temperature, 4.0604 g (0.02 mol) of terephthalic acid chloride were added as a powder in two equal increments (interval 15 minutes). The reaction was continued for 2 hours and the reaction product was neutralized with 1.19 g of anhydrous lithium hydroxide to obtain a transparent, viscous solution (polymer concentration 4.4%). The viscosity of the polymer solution obtained was 2200 poises and the inherent viscosity of the copolymer was 6.36. The composition of the random copolymer was such that 90 mol % of the entire repeating units was indicated by the point $P_5$ in FIG. 1 (Referential Example 9, C) and the remaining 10 mol % is represented by

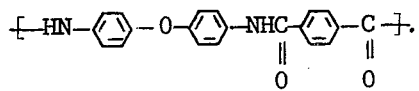

The polymer solution so obtained was spun and the resultant filaments were drawn by a method exactly the same as sample $C_5$ in Example 5.

The physical properties (T/E/Mi) of the resulting yarn were 20.8 g/d, 3.6% and 640 g/d, and as compared with the sample $C_5$ in Example 5, E was higher and Mi was lower, which was an effect of copolymerizing 10 mol % of said structural unit.

EXAMPLE 10

Polymer solutions G. H. I. J. and K were made by the same methods described in the preparation of polymer solution A in Example 5.

The details of reactants, reaction conditions and the viscosity data of the resultant polymers were shown in Table 12. The composition of each polymer is shown in the same table.

Each of the polymer solutions G. H. I. J and K above was defoamed under a reduced pressure, thereafter extruded from the spinneret having 6 orifices having a diameter of 0.8 mm at a speed of 0.3 ml/min into a coagulating bath having a length of 100 cm composed of aqueous solution of calcium chloride (a concentration of 300 g/1000 ml of water) and the resultant filaments were wound up at a speed of 8 m/min to obtain undrawn filaments.

The obtained as-spun filaments were washed in boiling water and subjected to various drawings with heat treatments as shown in Table 13 to obtain G. H. I. J and K having physical properties shown in Table 13.

Table 12

| | |
|---|---|
| Polymer solution | G |
| Solvent (ml) | DMAc (100) |
| Inorganic salt (g) | CaCl$_2$ (2.22) |
| Monomer | |
| HTH $\frac{g}{mole}$ | $\frac{1.5536}{0.008}$ |
| $\frac{g}{mole}$ 0.9072 | $\frac{0.006}{}$ |
| $\frac{g}{mole}$ | $\frac{0.6488}{0.006}$ |
| P $\frac{g}{mole}$ | |
| TPCl $\frac{g}{mole}$ | $\frac{4.0600}{0.0200}$ |
| Reaction temperature (°C) | 25 |
| Neutralization agent | Ca(CH$_3$CO$_2$)$_2$·H$_2$O |
| Polymer concentration (wt %) | 5.3 |
| Solution viscosity (poise) | 6200 |
| Inherent viscosity ($\eta_{inh}$) | 6.96 |
| Composition (mole %) | |
| [HT] unit | 65 |
| [A] unit | 17.5 |
| [PT] unit | 17.5 |
| Point in FIG. 1 | P$_{11}$ |
| Polymer solution | H |
| Solvent (ml) | DMAc (100) |
| Inorganic salt (g) | CaCl$_2$ (2.22) |
| Monomer | |
| HTH $\frac{g}{mole}$ | $\frac{1.9420}{0.010}$ |
| AH $\frac{g}{mole}$ | $\frac{0.5050}{0.00334}$ |
| P $\frac{g}{mole}$ | $\frac{0.7202}{0.00666}$ |
| TPCl $\frac{g}{mole}$ | $\frac{4.0600}{0.0200}$ |
| Reaction temperature (°C) | 25 |
| Neutralization agent | Ca(CH$_3$CO$_2$)$_2$·H$_2$O |
| Polymer concentration (wt %) | 5.3 |
| Solution viscosity (poise) | 3100 |
| Inherent viscosity ($\eta_{inh}$) | 6.11 |
| Composition (mole %) | |
| [HT] unit | 70 |
| [A] unit | 10 |
| [PT] unit | 20 |
| Point in FIG. 1 | P$_{12}$ |
| Polymer solution | I |
| Solvent (ml) | DMAc (100) |
| Inorganic salt (g) | CaCl$_2$ (2.22) |
| Monomer | |
| HTH $\frac{g}{mole}$ | $\frac{1.8099}{0.00932}$ |
| AH $\frac{g}{mole}$ | $\frac{0.2177}{0.00144}$ |
| P $\frac{g}{mole}$ | $\frac{0.9992}{0.00924}$ |
| TPCl $\frac{g}{mole}$ | $\frac{4.0600}{0.0200}$ |
| Reaction temperature (°C) | 25 |
| Neutralization agent | Ca(CH$_3$CO$_2$)$_2$·H$_2$O |
| Polymer concentration (wt %) | 5.2 |
| Solution viscosity (poise) | 1940 |
| Inherent viscosity ($\eta_{inh}$) | 5.78 |
| Composition (mole %) | |
| [HT] unit | 65 |
| [A] unit | 5 |
| [PT] unit | 30 |
| Point in FIG. 1 | P$_{13}$ |
| Polymer solution | J |
| Solvent (ml) | DMAc (100) |
| Inorganic salt (g) | CaCl$_2$ (2.22) |
| Monomer | |
| HTH $\frac{g}{mole}$ | $\frac{0.1670}{0.00086}$ |
| AH $\frac{g}{mole}$ | $\frac{2.047}{0.01392}$ |
| P $\frac{g}{mole}$ | $\frac{0.5645}{0.00522}$ |
| TPCl $\frac{g}{mole}$ | $\frac{4.0600}{0.0200}$ |
| Reaction temperature (°C) | 25 |
| Neutralization agent | Ca(CH$_2$CO$_2$)$_2$ |
| Polymer concentration (wt %) | 4.9 |
| Solution viscosity (poise) | 7100 |
| Inherent viscosity ($\eta_{inh}$) | 7.01 |
| Composition (mole %) | |
| [HT] unit | 45 |
| [A] unit | 40 |
| [PT] | 15 |
| Point in FIG. 1 | P$_{14}$ |
| Polymer solution | K |
| Solvent (ml) | DMAc (100) |
| Inorganic salt (g) | CaCl$_2$ (2.22) |
| Monomer | |
| HTH $\frac{g}{mole}$ | $\frac{1.0060}{0.00518}$ |
| AH $\frac{g}{mole}$ | $\frac{0.6713}{0.00444}$ |
| P $\frac{g}{mole}$ | $\frac{1.1225}{0.01038}$ |
| TPCl $\frac{g}{mole}$ | $\frac{4.0600}{0.0200}$ |
| Reaction temperature (°C) | 25 |
| Neutralization agent | Ca(CH$_3$CO$_2$))$_2$·H$_2$O |
| Polymer concentration (wt %) | 4.9 |
| Solution viscosity (poise) | 4200 |
| Inherent viscosity ($\eta_{inh}$) | 6.64 |
| Composition (mole %) | |
| [HT] unit | 50 |
| [A] unit | 15 |
| [PT] unit | 35 |
| Point in FIG. 1 | P$_{15}$ |

Table 13

| Polymer solution | Spinning conditions | Drawing and heat-treating conditions | Sample number | Yarn quality T/E/Mi | Denier |
|---|---|---|---|---|---|
| G | Orifice diameter 0.08 mm, 6 holes Discharging speed, 0.3 ml/min Spinning bath CaCl$_2$ aqueous solution (300 g/liter) Bath length 1 m, winding speed 8 m/min. After spinning washed in hot water at 90°C. | Non-treated | G$_1$ | 3.2/22.6/115 | 15.3 |
| | | Hot plate at 320°C, drawn 2.0 times | G$_2$ | 15.6/3.0/610 | 6.9 |
| | | G$_2$ was heated on hot plate at 380°, drawn 1.05 times | G$_3$ | 21.5/3.1/740 | 6.5 |
| H | The same as G | Non-treated | H$_1$ | 3.8/25.0/ | 16.1 |

Table 13-continued

| Polymer solution | Spinning conditions | Drawing and heat treating conditions | Sample number | Yarn quality T/E/Mi | Denier |
|---|---|---|---|---|---|
| | | Hot plate at 320° C, drawn 2.0 times | $H_2$ | 126 13.1/3.5/ 570 | 7.0 |
| | | $H_2$ was treated on hot plate at 380° C, drawn 1.05 times | $H_3$ | 18.8/3.8/ 660 | 6.6 |
| I | The same as G | Non-treated | $I_1$ | 4.2/23.0/ 145 | 14.4 |
| | | Hot plate at 320° C, drawn 1.9 times | $I_2$ | 14.1/3.0/ 720 | 6.4 |
| | | $I_2$ was treated on hot plate at 380° C, drawn 1.05 times | $I_3$ | 19.6/3.2/ 830 | 6.2 |
| J | The same as G | Non-treated | $J_1$ | 3.8/3.8/125 | 16.2 |
| | | Hot plate at 320° C, drawn 2.3 times | $J_2$ | 17.3/4.2/580 | 6.3 |
| | | $J_2$ was treated on hot plate at 380° C, drawn 1.05 times | $J_3$ | 24.2/4.6/620 | 6.1 |
| K | The same as G | Non-treated | $K_1$ | 4.1/20.5/176 | 15.7 |
| | | Hot plate at 320° C, drawn 2.2 times | $K_2$ | 16.6/2.9/640 | 6.3 |
| | | $K_2$ was treated on hot plate at 380°, drawn 1.05 times | $K_3$ | 23.2/3.0/860 | 6.1 |

EXAMPLE 11

In 110 ml of NMP, 21 g of lithium chloride, 2.4702 g (0.01272 mole) of terephaldehydrazide (HTH), 0.5504 g (0.00364 mole) of p-amino benzoic acid hydrazide (AH), 0.3936 g (0.00364 mole) of p-phenylenediamine and 5.3 ml of N,N-dimethyl aniline were dissolved at 90° C. After the resulting solution was cooled to 25° C, 4.0604 g (0.02 mole) of terephthalic acid chloride powder were added to said solution in two equal stages (interval 15 minutes). The reaction was continued for 2 hours in water bath to obtain a viscous, transparent solution (polymer concentration 5.0%). The viscosity of the solution was 1400 poises and the inherent viscosity of the copolymer was 4.64. The composition of the copolymer so obtained is shown by the point $P_{15}$ in FIG. 1, consisting of 80% of polyterephthal hydrazide unit [HT], 10% of poly-p-phenylene terephthalamide unit [PT].

Undrawn filaments and drawn filaments were obtained in the same methods as in Example 7. Table 14 shows the drawing conditions and the yarn properties.

Table 14

| Sample name | Drawing conditions | Denier (D) | Yarn quality (T/E/Mi) |
|---|---|---|---|
| A | Non-treated (yarn treated in hot water | 24.4 | 3.8/2.8/81 |
| B | Hot plate at 330° C, drawn 1.5 times | 13.7 | 8.4/3.4/385 |
| C | B was drawn 1.1 times on | 12.6 | 10.9/3.1/440 |

Table 14-continued

| Sample name | Drawing conditions | Denier (D) | Yarn quality (T/E/Mi) |
|---|---|---|---|
| | hot plate at 380° C | | |

The following is claimed:

1. High modulus and high tenacity aromatic polyhydrazide fiber composed of a copolymer, at least 85 mol % of the polymer chain of which consists essentially of repeating units from the group consisting of p-phenylene terephthalamide (PT), terethphal hydrazide (HT) and para-benzamide (A) in amounts within the range surrounded by a hexagon obtained by connecting with straight lines the points R, S, T, U, V and W in the triangular coordinates in the FIGURE, which is a ternary diagram of compositions consisting of (HT), (PT) and (A) and the points R, S, T, U, V and W therein represent mol % compositions as follows:

| (HT) | 75 | 60 | 42.5 | 30 | 60 | 70 |
| (PT) | 0 | 0 | 15 | 40 | 40 | 30 |
| (A) | 25 | 40 | 42.5 | 30 | 0 | 0 | said copolymer also including not more than 15 mol % of units selected from the group consisting of $(Ar_1-Z_1)$ and $(Ar_1-Z_1-Ar_2-Z_2)$, wherein $Ar_1$ and $Ar_2$ are groups selected from the class consisting of

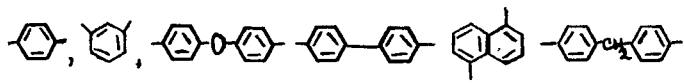

and a group obtained by replacing an H atom of these groups with an alkyl group or halogen, and $Ar_1$ and $Ar_2$ may be the same or different; $Z_1$ and $Z_2$ are groups selected from the class consisting of —CONH—, —NHCONH— and —CONH.NHCO—, and $Z_1$ and $Z_2$ may be the same or different.

2. The fiber according to claim 1 wherein said copolymer is a random copolymer.

3. The fiber according to claim 1 wherein the inherent viscosity of said polymer is at least 1.0, said inherent viscosity measured at 25°C in a 0.5 gram polymer per 100 ml. dimethyl acetamide solvent solution, said solvent containing 2.5% by weight lithium chloride.

4. The fiber according to claim 1 having a tenacity of at least 5.0 g/d and an initial modulus of elasticity of at least 300 g/d.

* * * * *